Patented Apr. 3, 1951

2,547,178

UNITED STATES PATENT OFFICE 2,547,178

CARBONYLATION CATALYST RECOVERY

John A. Spence, Richmond, Calif., assignor to California Research Corporation, San Francisco, Calif., a corporation of Delaware No Drawing. Application August 25, 1948, Serial No. 46,170

7 Claims. (Cl. 23—50)

This invention relates to the method of recovering metal catalysts from the organic products of catalytic conversion processes and, particularly, to the recovery of carbonyl-forming metal catalysts from the products of catalytic synthesis reactions involving carbon monoxide as a primary reactant.

Considerable difficulty has been experienced in the removal or recovery of metal contaminants in the organic products of carbonylation processes. In these processes the metal catalyst which is normally a carbonyl-forming metal, either in a free or combined form, undergoes a reaction or transposition resulting in substantial amounts of soluble metal compounds which remain dissolved or entrained in the reaction product. Depending upon the economics of the process and concentration of soluble metal compounds in the product, the problem of removal may be regarded as either one of product contamination or of catalyst recovery. In either event the removal of the metal compounds from the product necessitates complicated processing equipment and close control to avoid product losses.

This is particularly true in commercial installations and in processes in which the metal compounds are present in appreciable quantities and are recovered and converted into their original catalyst form for recycle into the process. Under these conditions the metal compounds must not only be recovered from the product with negligible product loss, but must also be recovered in such form as will allow a minimum reconversion processing into the original catalyst state. This situation particularly applies to the conduct of the so-called OXO processes wherein olefins, carbon monoxide and hydrogen are reacted in the presence of a metal catalyst such as cobalt or iron to produce aldehydes and/or alcohols. It is believed that regardless of the form in which the metal catalyst is introduced into the reaction, the conditions of the reaction result in the formation of metal carbonyls and/or metal carbonyl hydrides which are to a greater or less degree soluble in the desired oxonation products. Irrespective of the catalyst value of these product contaminants, further processing or even utilization of the products per se requires the elimination of the metal components from the product.

According to the subject invention, a processing method has now been discovered whereby the metal components found in the products of carbonylation processes may be substantially removed with a minimum of product loss and the catalytic metals recovered in a form suitable for reconversion and recycle to the process with a minimum of processing detail.

It has been found that by contacting the organic products of a carbonylation process containing entrained compounds of a carbonyl-forming metal catalyst with an oxygen-containing gas, a substantially complete removal of metal component may be effected and the catalytic metal converted into a recoverable form. In some instances the recovered metal catalyst may be recycled directly to the process without further reconversion, although in the preferred form of the invention the converted metal catalysts are acidified and recovered in the form of the desired metal salt.

This method of catalyst removal and recovery is generally applicable to those synthesis processes in which carbon monoxide either per se or in the form of a metal carbonyl is employed as one of the primary reactants and results in an organic product containing varying amounts of soluble compounds of a carbonyl-forming metal entrained therein. Processes of this nature are conventionally known as carbonylation processes and will be referred to as such in the subsequent description and claims of this invention.

Furthermore, when reference is made hereinafter to products containing entrained compounds of a carbonyl-forming metal, it is to be understood that such compounds may be soluble as well as dispersed within the product, and that the use of the terminology "entrained" is intended to cover either form in which the contaminant appears in the product.

These carbonylation processes have been used and proposed for use in the production of aldehydes, alcohols, carboxylic acids, esters, amides, etc., as well as derivatives thereof, and are derived from charge compounds containing at least one unsaturated bond which may be olefinic or acetylenic. The carbon monoxide may be reacted with the charge compounds in conjunction with a hydrogen-containing compound such as hydrogen, water, alcohols, ammonia, etc. The catalysts used in these processes are in general the carbonyl-forming metals and, in particular, nickel, cobalt and iron. These catalysts may be introduced into the process in the form of the metal, a metal salt, or directly as the metal carbonyl, and may be modified or activated by the addition of minor quantities of secondary catalysts. Regardless of the form in which the metal catalysts are incorporated into the reaction, it appears that at least certain amounts of the metal undergo reaction and form soluble metal compounds which are carried or become entrained with the products of the process. In most instances these soluble metal compounds have been identified as the metal carbonyl and metal carbonyl hydride.

In accordance with the invention, these entrained metal components may be recovered by contacting the product with an oxygen-containing gas. The particular conditions under which the product is treated will depend to a large extent upon the composition of the carbonylation product and the specific carbonyl-forming metal to be recovered. The reaction involved in the recovery method is an oxidation reaction in which the metal catalyst is oxidized to an insoluble and recoverable form without affecting the functional groups of the carbonylation product. In general, the reaction product is contacted with an oxygen-containing gas, such as air, at low temperatures and under conditions of agitation or maximum dispersion of gas into the product and at a space rate conducive to a minimum volatilization. Although atmospheric pressure may generally be used, superatmospheric pressure may be of advantage for the processing of low molecular weight products and recovery of extremely volatile and unstable catalysts, such as nickel carbonyl.

For the purpose of illustrating the specific process variables and the preferred recovery process, the invention will be more particularly applied to the processing of oxonation products resulting from an OXO process. In this type of process olefins, carbon monoxide, and hydrogen are reacted in the liquid phase under superatmospheric pressure and in the presence of a carbonyl-forming metal such as cobalt or iron with or without the addition of inert diluents or solvents such as water, toluene, etc. The desired oxonation products are the corresponding aldehydes and/or alcohols containing one more carbon atom than the charged olefin.

The preferred cobalt catalyst may be introduced in a variety of forms such as reduced cobalt metal supported on an inert carrier, cobalt salt of a fatty acid, cobalt carbonyl, or basic cobalt carbonate, the choice of which depends upon the charge olefin, desired product, method of process operation, etc. Regardless of the form in which the catalyst is introduced into the reaction, appreciable quantities thereof become dissolved into and are carried through by the oxonation products.

In order to effect the recovery of dissolved cobalt compounds, the oxonation product is contacted with air in a suitable reaction vessel under conditions of maximum dispersion. The conversion or oxidation of the metal components is conducted at a temperature below the effective oxidation temperature of the oxonation product, which is generally below 100° C. and preferably below about 80° C. There does not appear to be any lower limit to the operating temperatures although, for practical purposes, the rate of conversion at temperatures below 0° C. would be too slow to offer any advantages in operation. The optimum temperature of oxidation will depend upon the composition and/or oxidation stability of the oxonation product and will be a function of the contact or residence time. Generally, the higher the temperature, the shorter the residence time required for complete conversion or recovery of catalyst metal, and contrariwise.

The air rate is not a critical factor, although caution should be observed to prevent excessive volatilization of the organic product and metal compounds. Low air rates and means for effecting an intimate dispersion of air and product are preferred. The desired dispersion and contact between the air and the organic product may be obtained by introduction of the air stream through conventional dispersing means or by agitation within the recovery vessel.

When operating in this manner it has been found that the soluble metal components in the oxonation product will be oxidized to an insoluble form which precipitates from the organic product and may be removed by decantation or filtration. It has furthermore been found that the catalytic metals recovered in this manner are obtained in a reactive form and may be either directly recycled to the reaction zone or easily converted into their original catalyst state. Thus, the insoluble oxidized metal compounds may either be reduced to the metallic state or may be reacted with an acid to obtain the metal salt. Alternatively, the precipitated metal compounds may be slurried with the olefin and then charged to a catalyst preparation zone wherein carbon monoxide is contacted with the slurry in the presence or absence of hydrogen.

In the preferred form of the invention, the cobalt metal is recovered in the form of a fatty acid salt such as the cobaltous acetate. This may be accomplished either by oxidizing in the presence of acetic acid, in which case the cobalt contaminants are removed from the oxonation product as an aqueous solution of cobaltous acetate in one step, or the insoluble oxidized cobalt compounds may be separated and then taken up with glacial or aqueous acetic acid. The same procedure may apply to the extraction with other organic and inorganic acids and particularly to those acids which, with the cobalt or other carbonyl-forming metal, form a water-soluble salt. Naturally, when using a procedure which requires contact between the acid and carbonylation product, the choice of acid will also depend upon its effect on the desired oxonation product. Thus, strong mineral acids are to be avoided when working in contact with reactive carbonylation products.

Although the mechanism of the reactions involved in the carbonylation processes is not critical to the operation of the recovery process of this invention, it has been established that at least a portion of the carbonyl-forming metals, and particularly cobalt, is present in the organic product in the form of their carbonyl and carbonyl hydride. It is postulated and to some degree substantiated that the subject oxidation process oxidizes the carbonyl hydride and carbonyl successively to the insoluble basic carbonate. Thus, a solution of cobalt carbonyl in di-isobutylene was blown with air at a temperature of approximately 80° F. The cobalt was recovered as a dark purple colored precipitate which was insoluble in hydrocarbon solvents. This cobalt residue was then easily taken up by aqueous acids to form the cobaltous salts thereof.

The process of the invention is attended by a considerable number of advantages other than those previously ascribed, and may be conducted in batch or continuous manner with equal facility. One of the additional advantages which may be obtained by the recovery process, if desired, is a simultaneous separation of hydrocarbon normally associated in products of the OXO process. To this end the temperature and air rates are so selected that while oxidizing the entrained cobalt compounds in the oxidation product, the lower boiling hydrocarbon obtained by incidental hydrogenation of the feed stock is stripped from the product and recovered in a reflux or other conventional recovery system.

The following examples are presented as illustrative of the preferred embodiment of the invention as applied to a recovery of cobalt from oxonation products resulting from an OXO process conducted in the presence of an aqueous solution of cobalt acetate.

EXAMPLE 1

A crude nonyl alcohol was made by reacting the $C_8$ cut from commercial codimer with carbon monoxide and hydrogen at 375° F. and 3500 p. s. i. g. in the presence of an aqueous solution of cobalt acetate. The product contained in addition to the alcohol, octane and small quantiies of nonyl aldehyde, acetic acid and other by-products. It also contained a mixture of cobalt compounds, probably in the form of the carbonyl and carbonyl hydride, in amount sufficient to give a cobalt content of 2.5–3.0 mg. Co/ml. of crude product.

One hundred ml. of the above oil was charged with 50 ml. of water and 0.3 ml. of glacial acetic acid to a 400 ml. glass mixer having indented baffles in its sides and a centrally located shaft. Three banks of four paddles each were sealed to the shaft and served to agitate the mixture. The mixer had an air inlet tube sealed into the bottom and the entire apparatus was electrically heated. A reflux condenser was attached to the outlet from the mixer.

The mixture was stirred and air passed through it at a rate of 10 cu. ft. per hour. The chemical change in the reactor could be followed conveniently by observing the color which changed from the dark red-brown characteristic of the cobalt compounds in the oil to a clear, light red, the characteristic color of aqueous solutions of cobaltous acetate. When this change was complete the stirrer was stopped and the mixture allowed to settle. The oil and water layers separated readily with substantially no solid material at the interface. The oil layer was a very light tan in color and contained less than 0.01 mg. of Co/ml. The water layer contained 5 mg. of cobalt/ml. and 5 mg. of free acetic acid per ml.

The above experiment was repeated at several different temperatures and the following relationship established between temperature and the time required to complete the reaction.

| Temp., °F. | Time, Min. |
|---|---|
| 70 | 30 (approx.) |
| 120 | 10 |
| 155 | 5 |
| 180 | 3 |

Entirely similar results were obtained with a crude alcohol prepared from the $C_9$ cut of a propylene polymer. Dilute acetic acid containing up to 40 g. of cobaltous acetate tetrahydrate per hundred ml. of water can be used as a treating liquid and more concentrated aqueous cobalt acetate solutions so obtained.

EXAMPLE 2

The mixer described in Example 1 was set up as a continuous treating unit. It was arranged so that both the oil and the aqueous treating liquid could be pumped into the mixer at measured rates through the same inlet tube used for the air. All three phases were taken out of the mixer through an overflow line near the top and the gas stream disengaged and passed to an efficient reflux cooler. The condensed liquid was returned to the main body of liquid products. The liquid products were passed by gravity to a 200 ml. settling vessel where the aqueous phase settled out and could be withdrawn and recycled to the mixer if desired. The oil phase, now freed of cobalt, overflowed through a line near the top of the settling vessel.

The treating liquid used in the runs to be described consisted of a solution made by dissolving 40 g. of cobalt acetate tetrahydrate per hundred ml. of water. It was fed to the mixer at a constant rate of 420 ml./hr. Air was fed to the mixer at a rate of 0.6 cu. ft./hr. Under these conditions the liquid hold up of the mixer was 210 ml. from which an average residence time can be calculated. The treating temperature was 150–160° F.

The oil treated in these runs was made as in Example 1 from the $C_9$ cut of propylene polymer. It contained 3 mg. of cobalt/ml. and a little acetic acid. An additional 1% by volume of glacial acetic acid was blended with it. The feed rate of the oil was varied in successive runs. Results of these runs are given in the following table and serve to demonstrate the very high treating rates that can be achieved by this method in small equipment.

Table I

| Oil Feed Rate, ml./hr. | Ratio of Feeds, aqueous/oil | Average Residence Time of Oil, in Min. (Calc.) | mg. Co/ml. Organic Product |
|---|---|---|---|
| 210 | 2.0 | 20 | <0.01 |
| 660 | 0.64 | 12 | <0.01 |
| 840 | 0.5 | 10 | <0.01 |
| 2,100 | 0.2 | 5 | <0.01 |

EXAMPLE 3

A crude alcohol product was made from diisobutylene by the method described in Example 1. It contained 7.2 mg. of Co/ml. It was blended with 1% by volume of glacial acetic acid and fed to the mixer described in Example 2 at a rate of 1040 ml. per hour. The treating liquid was the same as in Example 2 and was fed at 450 ml./hr. The temperature and air rate were the same as in Example 2, and the product again contained less than 0.01 mg. Co/ml. The average residence time of the acid was 8.5 minutes.

During the run both the air inlet rate and the exit gas rate were measured and samples taken for analysis. Data obtained are given in the following table.

Table II

| | Rate, Cu. ft./hr. | Anal., Vol. Per Cent | | |
|---|---|---|---|---|
| | | $O_2$ | $N_2$ | CO |
| Air, Feed | 0.6 | 21.6 | 78.6 | |
| Tail Gas, Sample No. 1 | 0.75 | 17.1 | 66.5 | 15.5 |
| Tail Gas, Sample No. 2 | 0.75 | 16.3 | 65.6 | 16.2 |

The gas expansion obtained is largely due to the carbon monoxide liberated by the process

EXAMPLE 4

To the reactor, described in Example 1, there was charged 40 ml. of distilled water and a solution of 150 ml. of nonyl aldehyde, obtained from oxonation of diisobutylene, 3 ml. of glacial acetic acid, and 3 g. of cobalt carbonyl. The components were agitated and an internal temperature was obtained between 120 and 130° F. while air was added at the rate of 0.4 cu. ft. per hour. After 5 minutes the agitation was stopped and the heat source removed. The components separated into an oil and aqueous layer. The upper layer was a pale colored oil which, when washed with an equal volume of water, produced a colorless oil. The oil was then dried with anhydrous sodium sulfate. The charged aldehyde had a carbonyl number of 379 and contained 6 to 7 mg. cobalt, while the treated aldehyde had a carbonyl number of 379 and contained no cobalt. The cobalt was removed in the form of cobaltous acetate which was recoverable from the resulting aqueous wash and the aqueous layer from the reactor.

Obviously, many modifications and variations of the invention as hereinbefore set forth may be made without departing from the spirit and scope thereof, and only such limitations should be imposed as are indicated in the appended claims.

I claim:

1. The recovery of carbonyl-forming metal catalysts from the organic products of a catalytic conversion process employing said carbonyl-forming metal as an active catalyst component which comprises contacting said organic products with an oxygen-containing gas at a temperature below the effective oxidation temperature of said organic products for a period of time sufficient to oxidize the entrained metal compounds into a recoverable form and separating the resulting oxidized metal compounds from said organic products.

2. The recovery of entrained metal catalysts from the organic products of a catalytic carbonylation process which comprises contacting said organic products with an oxygen-containing gas at a temperature below the effective oxidation temperature of said organic products under conditions of agitation for a period of time sufficient to oxidize the entrained metal compounds into a recoverable form and separating the resulting oxidized metal compounds from said organic products.

3. The recovery of carbonyl-forming metal catalysts from the water-insoluble organic products of a catalytic carbonylation process which comprises contacting said organic products with an oxygen-containing gas at a temperature below about 100° C. in the presence of an aqueous solution of an acid capable of forming a water-soluble salt with said carbonyl-forming metal and recovering the resulting water-soluble salt from said organic products.

4. The recovery of carbonyl-forming metal catalysts from the organic products of a catalytic carbonylation process which comprises contacting said organic products with an oxygen-containing gas at temperatures below 100° C. for a period of time sufficient to oxidize the entrained metal compounds into a recoverable form and separating the resulting oxidized metal compounds from said organic products.

5. The recovery of entrained carbonyl-forming metal catalysts from the organic products of a catalytic carbonylation process which comprises contacting said organic products with an oxygen-containing gas at a temperature below the effective oxidation temperature of said organic products, acidifying the resulting oxidized metal compounds with an acid and recovering the entrained metal catalysts in form of their metal salts.

6. In the recovery of carbonyl-forming metal catalysts of a class consisting of nickel, cobalt and iron from the organic products of a catalytic conversion process, employing said carbonyl-forming metals as an active catalyst component, comprising the step of contacting said organic product with an oxygen-containing gas at a temperature below about 100° C. for a period of time sufficient to oxidize the entrained metal compounds into a recoverable form and separating the resulting oxidized metal compound from said organic products.

7. The recovery of entrained metal catalysts from the organic products of a catalytic carbonylation process which comprises contacting said organic products with an oxygen-containing gas at a temperature below the effective oxidation temperature of said organic products and acidifying the resulting oxidized metal compounds with an acid capable of forming a metal salt of said entrained metal which is insoluble in said organic product and recovering the resulting insoluble metal salt from said organic products.

JOHN A. SPENCE.

REFERENCES CITED

The following references are of record in the file of this patent:

UNITED STATES PATENTS

| Number | Name | Date |
| --- | --- | --- |
| 997,237 | Carrick | July 4, 1911 |
| 1,327,061 | Penniman et al. | Jan. 6, 1920 |
| 1,816,388 | Mittasch | July 28, 1931 |

FOREIGN PATENTS

| Number | Country | Date |
| --- | --- | --- |
| 643,814 | Germany | June 14, 1934 |

OTHER REFERENCES

"Interrogation of Dr. Roelau," PB 77705, pages 45 and 65, Hobart Publishing Co., Washington, D. C. Also entitled "OTS Report," published 7-18-47, also entitled "British Report (BIOS Final Report 447") published 5-6-46.